METHOD OF MAKING SOLID STATE RELAY DEVICES FROM TELLURIDES

Filed May 9, 1966

INVENTOR
STANFORD R. OVSHINSKY
BY
McCormick, Paulding & Huber,
Attorneys

United States Patent Office 3,395,445
Patented Aug. 6, 1968

3,395,445
METHOD OF MAKING SOLID STATE RELAY DEVICES FROM TELLURIDES

Stanford R. Ovshinsky, Bloomfield Hills, Mich., assignor to Energy Conversion Devices, Inc., Troy, Mich., a corporation of Delaware Continuation-in-part of applications Ser. No. 226,843, Sept. 28, 1962, and Ser. No. 252,511, Jan. 18, 1963. This application May 9, 1966, Ser. No. 564,456
6 Claims. (Cl. 29—569)

This invention relates to an electrical relay device comprising a solid state substance of the type referred to in my copending application, Ser. No. 226,843, filed Sept. 28, 1962. This application is a continuation-in-part of said application Ser. No. 226,843, now abandoned; and application Ser. No. 252,511, now abandoned, filed Jan. 18, 1963.

It is the general object of the invention to provide a very efficient relay or relay like control device for electrical circuits that uses a solid state semiconductor substance to effect the switching or control functions without the necessity for moving parts that may be subject to wear and possible malfunction.

A further object of the invention is to provide a relay or relay like device of the type mentioned which can be produced economically and in extremely small size to replace the relatively large and expensive conventional relays in many present installations, and to provide a control device that can be used in installations where no such control device previously existed because of a need for miniaturization.

The drawing shows preferred embodiments of the invention and such embodiments will be described, but it will be understood that various changes may be made from the constructions disclosed, and that the drawing and description are not to be construed as defining or limiting the scope of the invention, the claims forming a part of this specification being relied upon for that purpose.

Figure 1:
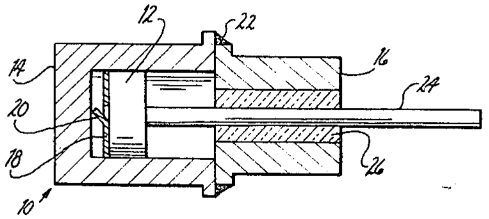
FIG. 1 is a longitudinal cross-sectional view of one form of the relay like device that can be provided in accordance with the present invention.

Each form of electrical relay provided in accordance with the present invention includes a solid state substance having the electrical characteristics required for relay functions. While it is believed that a plurality of other substances may provide the desired characteristics, it has been found that certain tellurium compounds have the required characteristics, and a presently preferred solid substance comprises a tellurium-aluminum compound or telluride.

The aforesaid aluminum telluride is preferably prepared by a method that comprises a plurality of steps, all of which are performed in a "dry box" or controlled atmosphere of argon or the like that is both moisture free and oxygen free. The first such step contemplated is the preparation of the tellurium and aluminum. The tellurium is prepared by grinding it to powdered form and sifting the powders to provide fine particles thereof. The aluminum is similarly prepared, i.e., particles are filed from a block of aluminum and sifted to provide similarly fine particles.

The particulate tellurium and aluminum constituents are then mixed together within the dry box. Preferably, a stoichiometric mixture is preferred, this comprising 87.6 parts by weight of tellurium to 12.4 parts by weight of aluminum. Other proportions can be used as, for instance, 85 parts tellurium—15 parts aluminum, and 90 parts tellurium—10 parts aluminum, said parts being by weight. The mixed metal particles are then placed in a crucible which does not react with the tellurium and aluminum, such as quartz or the like, within the dry box or in the controlled atmosphere and heat is applied in sufficient degree to effect fusion of the mixture.

Then, the fused mixture or telluride which it comprises is cooled within the dry box or controlled atmosphere to a degree where it can be handled and the fused block is crushed, filed or ground again into particulate form. The powder or particles are then compacted in a press into a pellet. The grinding, filing and compacting means are such as not to react with the tellurium and aluminum and may be made of stainless steel or the like.

While still within the controlled atmosphere or dry box, the pellet is placed in a container and suitably engaged by electrodes for connection in an electrical circuit and the container is sealed before it is removed from the dry box or atmosphere. The container, pellet, and electrode elements comprise the completed solid state relay device, an exemplary form of such device being indicated generally by the reference numeral 10 in FIG. 1 which will now be described.

As shown in FIG. 1, the relay device 10 comprises the solid state aluminum telluride pellet 12 which is located within a two-part container comprising a cup-shaped part or receptacle 14 and a cap 16. Preferably, the pellet 12 is formed in such size that it will slidably engage the wall of the bore in the cup-shaped section 14 of the container and thereby effect an electrical contact therewith, the cup-shaped member 14 being made of an electrical conducting material so that it may comprise one of the electrodes engaging the telluride pellet 12.

Preferably, the pellet 12 is seated within the cup-shaped member 14 on a disc 18 having a spring appendage 20 engaging the closed end wall of the cup-shaped member 14. The cap 16 closes the open end of the cup-shaped member 14 and is sealed and rigidly connected thereto as by the application of solder 22. A second electrode 24 is provided in elongate form to extend through a central aperture in the cap 16 and press against the pellet 12. The electrode 24 is secured in the cap 16 by an insulating material 26 such as glass which provides an hermetical seal as well as the required electrical insulation. Thus, the relay device can be connected in an electrical circuit by connecting the cup-shaped electrode 14 and the elongated electrode 24 to conductors or wires in the circuit.

Figure 2:
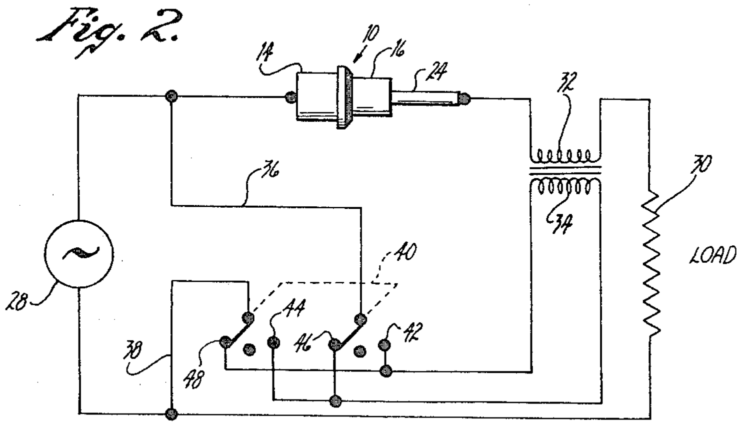
FIG. 2 is a wiring diagram illustrating the application of the device to an electrical circuit.

Such a circuit is shown in FIG. 2 for purposes of illustration, and it will be observed that in this circuit the relay device 10 is connected in series with an electromotive supply, such as an A.C. source of electrical energy 28, and a load 30 and that the primary winding 32 of an inductance transformer is also included in the load circuit.

It has been found that when the relay device of this invention is connected in a load circuit as described, it will block the flow of current in the circuit at all applied voltages below a predeterminable threshold level. However, when the applied voltage reaches the predeterminable threshold level, a substantially instantaneous avalanche condition occurs and the device will pass the flow of current with minimal resistance and voltage drop and permit a substantially undistorted signal to pass. The current flowing or "on" condition for the relay will continue at applied voltages in excess of the previously mentioned threshold level and even at applied voltages less than the threshold level. The current blocking or "off" condition will be reinstated only when the applied voltage reaches a predeterminable level below the previously mentioned threshold. Accordingly, the use and advantage of the device 10 as a relay will be apparent when it is understood that the applied voltage level can be shifted as desired to effect the "on" and "off" conditions by a low voltage control circuit.

Illustrative of this, there is shown in the wiring diagram of FIG. 2 a control circuit which inlcudes the secondary winding 34 of the previously mentioned inductance transformer. Leads 36 and 38 are connected on opposite sides of the serially connected relay 10, the primary winding 32, and the load 30, and these leads are selectively connected to opposite ends of the secondary winding 34 for in-phase or out-of-phase connection as by a conventional double pole switch 40. More specifically, the switch 40 includes a double pole armature that can be utilized to connect the lead 36 with a contact 42 while connecting the lead 28 with a contact 44, the said contacts being connected with the end of the secondary winding 34 so that an in-phase condition will occur when this is done. Alternatively, the switch 40 can be thrown to connect the lead 36 with a contact 46 while connecting the lead 38 with a contact 48, these contacts being connected with the ends of the secondary winding 34 to provide an out-of-phase condition when this is done. Obviously, when the switch 40 is thrown to provide an in-phase connection for the control circuit, the voltage applied to the load circuit is increased, and when the switch is thrown to effect out-of-phase connections for the control circuit, the applied voltage is reduced.

By way of an operating example, let it be assumed that the source 28 provide 110 volts of alternating current which will be blocked by the relay 10 so that no current will flow across the load until the applied voltage reaches a threshold level of 115 volts. Further, let it be assumed that the passing or "on" condition will continue until the applied voltage reaches the low threshold of 90 volts. Then, by providing the proper inductance transformer, and by throwing the switch 40 to effect in-phase operation of the control circuit, the applied voltage may be raised to 115 volts and the "on" condition will occur and current will flow in the load circuit. The aforesaid "on" condition will continue after the switch 40 is moved to a neutral position. Blocking will be reinstituted only when the switch 40 is thrown to create an out-of-phase connection for the control circuit to reduce the applied voltage to 90 volts. The blocking or "off" condition will continue after the switch 40 has been returned to a neutral position.

Figure 3:
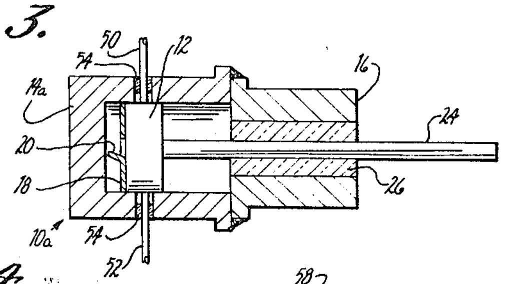
FIG. 3 is a view similar to FIG. 1 but showing a modified form of the relay device.

The in-phase and out-of-phase or siding and bucking voltages can be applied to the control device or relay by an alternative form of control circuit if the relay device is modified slightly to accommodate a second pair of electrodes. A so-modified relay device **10*a* is shown in FIG. 3 wherein the same reference numerals are used to indicate elements identical to the elements of the relay device of FIG. 1. It will be observed that a slightly modified cup-shaped receptacle 14*a* is employed, this receptacle being provided with a pair of apertures to accommodate control electrodes 50 and 52. These electrodes project through the side wall of the receptacle 14*a* to engage the telluride pellet 12, the electrodes being hermetically sealed and electrically insulated in position by glass seals 54, 54**.

Figure 4:
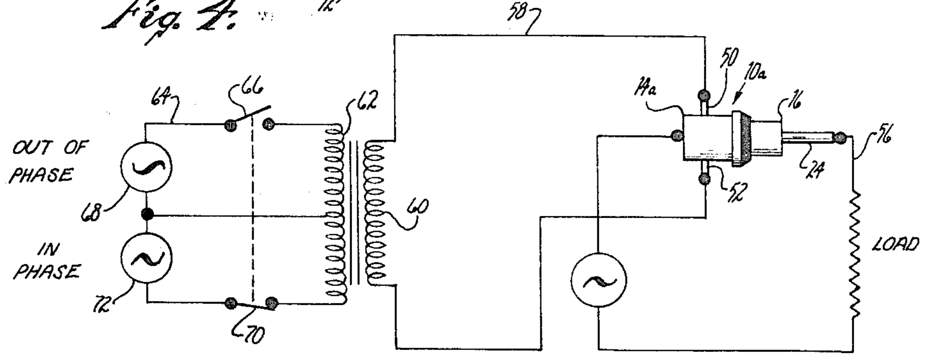
FIG. 4 is a further wiring diagram showing the application of the relay device of FIG. 3 to an electric circuit.

When the relay device **10*a* of FIG. 3 is incorporated in a load circuit 56, such as illustrated in FIG. 4, the telluride pellet 12 is connected in a control circuit 58 by means of the electrode 50 and 52. The control circuit 58 includes the secondary winding 60 of a control transformer having a split primary winding 62. A portion of the primary winding 62 is connected in a circuit 64 which includes a conventional switch 66 and an out-of-phase source of electrical energy 68. When the switch 66 is closed, an out-of-phase or bucking signal is transmitted to the telluride pellet 12 to reduce the voltage and effect current passing or "on" operation of the relay 10*a***.

Another portion of the primary winding 62 is connected in circuit with a switch 70 and an in-phase source of electrical energy 72 so that when the switch 70 is closed an aiding voltage signal will be transmitted to the pellet 12 to effect current blocking or "off" operation of the relay **10*a*. Preferably, the switches 66 and 70** are arranged for ganged operation as illustrated so that when one switch is closed the other will be open and vice versa and so that both switches can be open at the same time.

It has been found that other tellurium compounds can be provided in accordance with the present invention to form the solid state pellet 12 and that certain of these compounds need not be prepared in the controlled atmosphere found desirable for the aluminum telluride pellet that has been described. More specifically a weight mixture of 10 percent germanium and 90 percent tellurium powders or particles, or 15 percent germanium and 85 percent tellurium powders or particles, can be heated in air to the point of fusion to form the desired pellet. Preferably, the mixture is placed in a mold which does not react with the tellurium and germanium, such as quartz or the like, so that the fused product will be in desired pellets shape, and it should be understood that the percentages given for germanium and tellurium are only approximate.

The same technique can be employed in providing a solid state pellet substance comprising gallium arsenide and tellurium as its constituents. In this case, approximately 50 percent by weight of gallium arsenide is mixed with approximately 50 percent by weight tellurium in powder form. Here again, the mixture is preferably heated in air within a mold which does not react with the tellurium and gallium arsenide, such as quartz or the like, to form the final shape of the pellet. Other illustrative compositions of this type are 40 percent gallium arsenide—60 percent tellurium, and 60 percent gallium arsenide—40 percent tellurium, said parts being by weight.

While it will be understood that the pellets formed from these other tellurium compounds need not be used within a sealed container to avoid the influence of atmospheric conditions, they can be so used if desired.

I claim as my invention:

1. The method of making a solid state switch device for connection in an electrical circuit for selectively conducting and blocking current flow therethrough and comprising the steps of produing a telluride body which is capable of having one condition of high resistance for blocking current flow, of having another condition of low resistance for conducting current flow and of being reversibly switched between said one and other conditions by combining tellurium with a material from the class consisting of aluminum and gallium arsenide by the application of heat, said tellurium being at least 50% by weight of the combination, and shaping the body to accommodate the engagement of electrode means.

2. The method of making a solid state switch device for connection in an electrical circuit for selectively conducting and blocking current flow therethrough and comprising the steps of producing a telluride body which is capable of having one condition of high resistance for blocking current flow, of having another condition of low resistance for conductnig current flow and of being reversibly switched between said one and other conditions by mixing a quantity of powdered tellurium with a powdered material from the class consisting of aluminum and gallium arsenide, said tellurium being at least 50% by weight of the mixture, subjecting the mixture to heat sufficient to effect fusion thereof and shaping the resultant body to accommondate the engagement of electrode means.

3. The method of making a solid state switch device for connection in an electrical circuit for selectively conducting and blocking current flow therethrough and comprising the steps of producing a body which is capable of having one condition of high resistance for blocking current flow, of having another condition of low resistance for conducting current flow and of being reversibly switched between said one and other conditions by combining, by the application of heat in a moisture and oxygen free atmosphere, tellurium and aluminum, said tellurium being at least 50% by weight of the combination, shaping the body to accommodate the engagement of electrode means, and placing the body in a sealed container while still in said atmosphere so that it can be engaged by said electrode means.

4. The method of making a solid state switch device for connection in an electrical circuit for selectively conducting and blocking current flow therethrough and comprising the steps performed in a moisture and oxygen free atmosphere of producing a body which is capable of having one condition of high resistance for blocking current flow, of having another condition of low resistance for conducting current flow and of being reversibly switched between said one and other conditions by mixing quantities of particulate tellurium and aluminum, said tellurium being at least 50% by weight of the combination, subjecting the mixture to heat sufficient to fuse the mixture, shaping the body to form surfaces engageable by electrode means, and placing the body in a sealed container for engagement by said electrode means.

5. The method of making a solid state switch device for connection in an electrical circuit for selectively conducting and blocking current flow therethrough and comprising the steps performed in a moisture and oxygen free atmosphere of producing a body which is capable of having one condition of high resistance for blocking current flow, of having another condition of low resistance for conducting current flow and of being reversibly switched between said one and other conditions by mixing quantities of particulate tellurium and aluminum, said tellurium being at least 50% by weight of the mixture, subjecting the mixture to heat sufficient to fuse the mixture, cooling the fused mass, crushing the mass into particles, compacting the particles into a desired solid shape body, and placing the body into a sealed container having electrode means associated therewith capable of effecting connection of the shaped compound in an electrical circuit.

6. The method of making a solid state switch device for connection in an electrical circuit for selectively conducting and blocking current flow therethrough and comprising the steps performed in a moisture and oxygen free atmosphere of producing a body which is capable of having one condition of high resistance for blocking current flow, of having nother condition of low resistance for conducting current flow and of being reversibly switched between said one and other conditions by mixing approximately stoichiometric quantities of particulate tellurium and aluminum to form a body having the properties of $Al_2Te_3$ subjecting the mixture to heat sufficient to fuse its constituents, cooling the fused mass, crushing the mass to particles, compacting the particles into a desired solid shape body, and placing the body into a sealed container having electrode means associated therewith capable of effecting connection of the shaped mass in an electrical circuit.

References Cited

UNITED STATES PATENTS

| | | | |
|---|---|---|---|
| 1,847,888 | 3/1932 | Nickle | 338—20 |
| 3,005,861 | 10/1961 | Tiller et al. | |
| 3,059,040 | 10/1962 | Schreiner et al. | |
| 3,137,593 | 6/1964 | Birkholz. | |
| 3,182,391 | 5/1965 | Charland et al. | 29—573 X |
| 3,271,591 | 9/1966 | Ovshinsky | 307—88.5 |

JOHN F. CAMPBELL, *Primary Examiner.*

P. M. COHEN, *Assistant Examiner.*